United States Patent
Pavis et al.

(10) Patent No.: US 7,005,133 B2
(45) Date of Patent: Feb. 28, 2006

(54) COMPOSITION AND PROCESS FOR TREATING POLLUTION

(75) Inventors: Vincent Pavis, Santa Monica, CA (US); James Pavis, San Ramon, CA (US)

(73) Assignee: International Environmental Products, LLC, Cohshohocken, PA (US)

( * ) Notice: Subject to any disclaimer, the term of this patent is extended or adjusted under 35 U.S.C. 154(b) by 673 days.

(21) Appl. No.: 09/900,596

(22) Filed: Jul. 6, 2001

(65) Prior Publication Data

US 2002/0022041 A1 Feb. 21, 2002

Related U.S. Application Data

(60) Provisional application No. 60/217,472, filed on Jul. 11, 2000.

(51) Int. Cl.
*A61K 9/107* (2006.01)
*A61K 47/10* (2006.01)

(52) U.S. Cl. ............ 424/400; 424/76.5; 514/937; 516/57; 516/76

(58) Field of Classification Search ......... 514/937; 424/400, 84, 76.5; 516/57, 76
See application file for complete search history.

(56) References Cited

U.S. PATENT DOCUMENTS 4,460,692 A * 7/1984 Tellier et al. ............ 435/248
5,171,475 A * 12/1992 Freiesleben ............ 510/245

* cited by examiner

*Primary Examiner*—Edward J. Webman
(74) *Attorney, Agent, or Firm*—John F. Letchford; Archer & Greiner, P.C.

(57) ABSTRACT

A composition for treatment of pollution comprises a first component comprising a carbon containing substance in an oil phase and a second component comprising a nutrient in a water phase, the second component being formed as an emulsion within the first component. A third component comprising a diluent is added to the first and second components.

23 Claims, 1 Drawing Sheet

FIGURE 1

COMPONENT ONE
Outer - Oil Phase

Assimilable Carbon Containing Emulsifying Agent
fatty acid, ester or alcohol
    Oleic Acid; Stearic Acid
        20-50% by Weight

COMPONENT TWO
Inner - Water Phase

| | |
|---|---|
| Water | 20-400 angstrom droplets<br>11-50% by weight |
| Urea | 0-30% by weight |
| Phosphate Ester<br>Lauryl Phosphate | 0-20% by weight |

COMPONENT THREE
Oil Phase Diluent/Stabilizer

Ethoxylated Alcohol   22-35% by weight
Butyl Carbitol 2-(butoxyethoxy)ethanol

COMPOSITION AND PROCESS FOR TREATING POLLUTION

CROSS-REFERENCE TO RELATED APPLICATIONS

This application claims the benefit of U.S. Provisional Application No. 60/217,472 filed Jul. 11, 2000, which is incorporated herein by reference in its entirety.

FIELD AND OVERVIEW OF THE INVENTION

This invention relates to compositions and methods for treating pollutants, and, more particularly for pollution caused by spills of petroleum products.

The invention is for a composition and method for the bioremediation and subsequent emulsification of a petroleum product that has been spilled upon a portion of the earth's surface.

The composition of the invention is preferably comprised of three basic components. The first component is an assimilable carbon containing composition, preferably one for emulsifying fats and oils, and may contain non-toxic primary surfactants and/or secondary surfactants.

This second component comprises a nutrient which is introduced to the hydrophobic carbon containing emulsifying material, which is the first component.

The third component comprises a compound that is also carbon containing, both non-toxic and non-flammable, and acts as a diluent for the microemulsion, preferably facilitating the safe application of the bioremediation active ingredients (the first and second components) evenly and thoroughly onto the petroleum product contaminant.

BACKGROUND OF THE INVENTION

Technology and industry has relied substantially on the use, by-products and energy, of oil and oil-based products. In fact, this reliance continues to grow, with the result that accidents with oil based products will occur with greater frequency causing oil pollution, sometimes of a serious nature.

Various approaches have been used in combating or remediating oil related pollution. In this regard, the remediation industry has relied primarily on mechanical devices and methods to remove contamination from the affected area. Unfortunately, these methods are not always satisfactory. In certain instances, the mechanical solution results in the pollutant merely being moved off site. In an even worse situation, the pollutant is transferred to another medium, such as the air, through burning. The process by which these mechanical devices "remove" the contaminant can often be as destructive to the environment as the original pollution itself.

Another approach to pollution cleanup has been through the use of microorganisms. It is known that there exists a well established, highly diverse population of microorganisms that degrade petroleum hydrocarbons. The application or utilization of petroleum degrading microorganisms in spilled oil situations is known generally as the process or method of bioremediation. Bioremediation has been successfully used to treat contaminated soil in above-ground treatment systems, above-ground slurry bioreactors, slurry pits, above-ground soil heaps, composting material, and in situ. A good example showing the use of in situ soil treatment by microorganisms followed the Exxon Valdez oil spill in Prince William Sound, Ak. in 1989. This spilled oil contaminated miles of Alaskan shoreline. An approximately 70 mile section of shoreline was treated using bioremediation techniques. One aspect of the remediation process employed in Prince William Sound focused on enhancing the indigenous microorganisms' growth and oil degrading activities through the application of nutrients (see Roger Prince, et al. 1993 "Bioremediation of the Exxon Valdez Oil Spill: Monitoring Safety and Efficacy," Lewis Publishers; 107–124; 1994).

Unfortunately, there are a number of shortcomings in existing bioremediation technologies. For example, the Inipol technology advanced by the French contains a stabilizer in amounts that exceed OSHA exposure limits. This apparently has led to several reported health claims to the Alaska Worker's Compensation Board (see, for example, Roberts vs Veco, 1996 Alaska Worker's Compensation Board, AWCB Case #9034054, AWCB Decision #96-0029), and severely restricted the product's use.

The exposure limits established by OSHA often in fact prevent the use of many bioremediation products in enclosed environments, such as within a plant structure. It is recognized that worker exposure to bioremediation products may be a far greater health risk than the hydrocarbon contamination itself. Therefore, within these areas, standard degreasers substitute as clean up techniques for the more effective and environmentally sound use of bioremediation.

Another limitation preventing the widespread use of bioremediation in active work sites is the flammability issue. Refineries and terminals, which are key handlers of oil and thus key sites of hydrocarbon contamination, have strict safety procedures regulating the use and transportation of flammable material within active facilities. These regulations are also followed by DOT, OSHA and other agencies supervising the use of flammable and combustible products.

The Exxon Valdez oil spill identified the enhanced effectiveness of hydrophobic microemulsions over traditional hydrophilic nutrients (see Roger C. Prince, et al. 1993 "Laboratory Studies of Oil Spill Bioremediation; Towards understanding field behavior," Exxon Research and Engineering.). However, traditional ingredients chosen for the microemulsion to advance "environmentally sound" technology were not environmentally sound themselves. This gap between appropriate available technology and the market need has prevented the widespread use of bioremediation. The solution to bridging this gap began with understanding the advantages and shortcomings of existing technology and applying "environmental" criteria to advance the performance of bioremediation methods.

A number of factors determine the effectiveness of the bioremediation process. First, there must be hydrocarbon degrading microorganisms present, either indigenous or through addition. Second, there must be oxygen and water available to permit the microorganisms to be metabolically active. Third, there must also be available sufficient quantities of biologically utilizable nitrogen and phosphorous to enable the microbial population to rapidly metabolize the available petroleum hydrocarbons. As significant quantities of petroleum pollute a medium (water, shoreline, or soil), essential nutrients must be applied to the petroleum to sustain microbial growth.

U.S. Pat. No. 4,460,692 (Tellier) discloses a microemulsion made of a nutrient formulation comprising a hydrophobic external phase and an internal water-soluble internal core. The stabilizer package is chosen for its volatility and is listed as butyl ether of ethylene glycol, an undesirable product on the OSHA exposure list.

U.S. Pat. No. 3,883,397 (Townsky) discloses a particulate material made of a nutrient formulation coated with a lipophilic material that suspends the material in the oil or near the oil-water interface. This coating is composed of magnesium, aluminum and calcium salts of lipophilic fatty acids, specifically magnesium stearate.

U.S. Pat. No. 5,725,885 (Felix) discloses a composition that is broader than either listed in the above patents. The use of oxygen generating materials clearly advances the rate of bioremediation, but compromises the very issues holding the market back from utilizing the process. The toxicity and flammability of peroxide containing compounds is an industrial concern.

U.S. Pat. No. 5,384,048 (Hazen) describes an apparatus and a nutrient fluid to stimulate the natural degradation of chlorinated hydrocarbons. Unfortunately, the carbon source, methane, is highly combustible, limiting the commercial use of Hazen in bioremediation contexts.

SUMMARY OF THE INVENTION

According to one aspect of the invention, there is provided a composition for treatment of pollution comprising: a first component comprising a carbon containing substance in an oil phase; a second component comprising a nutrient in a water phase, the second component being formed as an emulsion within the first component; and a third component comprising a diluent added to the first and second components.

Preferably, the first component is selected from the group consisting of fatty acids, esters, alcohols and combinations thereof, and the first component may be an alcohol surfactant with the ability to emulsify fats and oils. Preferably, the first component comprises an acid selected from the group consisting of oleic acid, stearic acid and combinations thereof. The oleic acid or stearic acid may be present in the composition in concentrations ranging between about 20% and 50% by weight.

Preferably, the second component comprises a source of nitrogen and/or phosphorus. The nitrogen may be in a non-toxic form and is preferably selected from the group consisting of urea, cyanamide, and combinations thereof. The phosphorus may also be in a non-toxic form and may comprise a phosphate ester.

In a preferred embodiment, the composition further comprises water.

Preferably, the diluent is present in sufficient amounts so as to facilitate the even application of the composition to a pollution area. The diluent may be a carbon containing, non-toxic, non-flammable stabilizer, and is preferably butyl carbitol [2-(2-butoxyethoxy) ethanol]. The diluent may be selected so as to maintain a flashpoint for the composition above 100° C.

In a preferred embodiment, the composition comprises 20 to 50% by weight carbon, 0 to 30% by weight nitrogen, 0 to 20% by weight phosphorus. The composition may comprises about 22% by weight carbon, about 15% by weight nitrogen, about 25% by weight phosphorus, about 22% by weight diluent and about 18% by weight water.

According to another aspect of the invention, there is provided a method of forming composition for treatment of a pollution site, the method comprising: selecting a first component comprising a carbon containing substance in an oil phase; mixing a second component with the first component, the second component comprising a nutrient in a water phase, the second component being formed as an emulsion within the first component; and diluting the first and second components in a third component comprising a diluent selected for its ability to facilitate application of the composition to a pollution site.

In one form, this invention relates to the use of bioremediation processes having improved environmental soundness and efficiency over existing technologies. While the concept of bioremediation is decades old, many currently available products or components used in bioremediation fail to conform with government environmental standards relating to such factors as, for example, worker exposure, risk assessment within operating facilities, and inherent toxicity. Thus, the existing uses of bioremediation, or "green", technologies are compromised by the presence of products or components that are not themselves "green" or environmentally friendly.

This invention, in one aspect, may significantly expand the potential use of bioremediation by focusing on this clear industrial need, and formulates a bioremediation composition which does not have some or many of the undesirable environmental side effects of existing compositions. By conforming to OSHA, DOT, and EPA environmental standards, the bioremediation process of the invention may, for example, be sufficiently safe to take inside industrial facilities. It may be used on the grounds of active refineries, and applied indoors or out without damaging the environment in any way and without exposing workers applying the material.

The present invention teaches the compositions and methods for the production of a unique, non-toxic, non-flammable, stable microemulsion, consisting of three components which can be distributed by widely used commercial techniques, such as spraying or any other methods for dispersing the emulsion safely and evenly over petroleum materials that have been spilled upon the surface of the earth. The first component comprising the composition of the invention is any primary non-ionic, fatty acid, ester, or alcohol non-toxic surfactant known to the art for emulsifying fats and oils. The second component comprises a water based nutrient composition to be held in a microemulsion of water in oil for the purpose of culturing microorganisms normally extant or seeded in the spilled petroleum media. The third component is a carbon containing non-toxic, non-flammable stabilizer to dilute the other (active) components of the composition to a viscosity required or optimal for such application.

When this composition is applied to a fuel polluted surface, the outer phase of the emulsion (i.e. the first component) is assimilated and degraded by the microorganisms in the petroleum medium, gradually exposing the nutrient rich water or inner phase of the emulsion (i.e. the second component). The nutrient greatly accelerates the culturation of the microorganisms present and, therefore, the speed of the bioremediation process One aspect of the present invention thus teaches the composition and processing methods which result in the safe application of bioremediation materials that promote the growth of petroleum degrading bacteria. The composition is preferably in the form of a microemulsion composed of an outer carbon-containing emulsifying surfactant or surfactants as a lipophilic external phase, and an associated inner fertilizer or nutrient-rich component dissolved in water as distinct, uniform, suspended droplets as a water in oil microemulsion.

The oil or outer portion is preferably a lipophilic, straight-chained carbon source such as oleic or stearic acid. The fertilizer package is preferably nitrogen in the form of water-soluble urea compounds and phosphorous in the form of microbial phosphate compounds.

An important aspect of the invention is the use of biodegradable butyl carbitol [2-(2-butoxyethoxy)ethanol] to dilute and stabilize the micro emulsion, to maintain a flashpoint above 100° C. and to ensure that the product is not harmful to humans exposed to the composition of the invention, either through the application process or by working in contiguous areas.

The composition of the invention is applied to the contaminated areas to initiate microbial development. The preferred dosage is a rate between 4% and 20% by weight of the hydrocarbon contamination, that is, 4 to 20 parts by weight of the bioremediation composition to 80 to 96 parts by weight of the petroleum contaminant. The application can be achieved by any conventional techniques including, but not limited to, spraying, pouring, or physical mixing.

The invention can be used in both soil and aqueous environments, which may be open or closed. The soil environments may include soil in above-ground treatment systems, above-ground slurry bioreactors, slurry pits, above-ground soil heaps, composting material, in situ, and the like. The aqueous environments may include lakes, ponds, rivers, slurry pits, above-ground slurry bioreactors, bioreactors, ground water, and the like.

This invention may achieve significantly enhanced levels of bioremediation, which may result from the use of a biodegradable, microbial consumable stabilizer source. The current stabilizers available on the market rapidly evaporate off, not only polluting the environment, but not benefitting the overall bioremediation process.

The present invention may be highly advantageous when applied to environments requiring bioremediation activities in that it provides a way to efficiently deliver essential nutrients, in an environmentally sound way.

BRIEF DESCRIPTION OF THE DRAWINGS

FIG. 1 is a table showing the components which make up the composition of the invention and some of the preferred embodiments thereof.

DETAILED DESCRIPTION OF THE INVENTION

The materials employed in the present invention deliver carbon, nitrogen, and phosphorus to the microorganisms involved in the bioremediation. Nitrogen must be delivered in a substantially non-toxic form such as urea or cyanamide. Phosphorus must be delivered in a substantially non-toxic form such as a phosphate ester. Carbon must be delivered in a substantially non-toxic, nonflammable form such as oleic acid and 2-(2-Butoxyethoxy)ethanol. Further, a portion of the carbon delivered to the system must be in the form of a microemulsion external phase so that microorganisms consume the carbon containing outer phase, gradually exposing and releasing the water, nitrogen and phosphorous nutrients that cultivate and cause rapid growth of the microorganisms, thus greatly speeding and extending the bioremediation process. Delivery of the nutrients within the oil/water interface in this manner ensures the best results by making the necessary culturing ingredients available for consumption over a longer period of time, thus extending the effectiveness of the bioremediation process over time. This arrangement yields the best results by making the necessary products available for use.

The amount of carbon, nitrogen, and phosphorus can be varied in the composition. Thus, compositions may have from about 25 to 50 percent by weight of carbon, from about 0 to 30 percent by weight of nitrogen, and from about 0 to 20 percent by weight of phosphorus. Stabilizers, which comprise the third component of the composition of the invention, may be present in ranges from about 15 to 35 percent. In one preferred embodiment the total carbon is 22% by weight, the total nitrogen is 15% by weight, the total phosphorous is 25% by weight, and the total stabilizer is 22% by weight. Water is present at a concentration of about 18% by weight.

A composition prepared and constituted in accordance with the particulars provided above will preferably result in a composition which is environmentally sound and safe to use. The use of a microemulsion including the described components may allow the expansion of bioremediation technologies into significantly new areas which have hitherto been inaccessible due to the toxicity or other undesirable properties of the components of existing products.

Further, the compositions and methods of the invention may provide a cost effective, environmentally superior approach to one of the most basic environmental challenges facing industry today. Of course, many changes and substitutions could be made to the preferred microemulsion without departing from the spirit and scope of the present invention. For example there are many assimilable carbon containing surfactants known to the art that are nontoxic and non-flammable that could be used in the lipophilic outer phase and a host of water soluble fertilizers containing nitrogen and/or phosphorous that could constitute the inner hydrophilic phase. Also, there could be carbon containing non-toxic and non flammable compounds other than ethoxylated esters or alcohols, such as butyl carbitol, that could stabilize and act as a diluent for such a microemulsion.

Table 1 below sets out some of the physical properties of the composite materials and their formulation. The table contains data extracted from "The Condensed Chemical Dictionary, 9$^{th}$ Edition," 1977 VanNostrand Reinhold Co., New York, N.Y.

TABLE 1

| Component | Formula | Toxicity | Flash Point |
|---|---|---|---|
| Oleic Acid | $C_{25}OOH$ | Non toxic | 372° F. |
| 2-Lauryl Phosphate Soln | $C_4H_9OCH_2CH_2OCH_2CH_2OH$ $C_{22}(PO_4) + H_2O$ | Non toxic Non toxic | 172° F. |
| Composite Materials | | | >200° F.* |

*Pensky-Martens Closed Tester, ASTM 93

The composition, and methods, for the bioremediation and subsequent emulsification of a petroleum product that has been spilled upon a portion of the earth's surface preferably comprise three components which must be present in a unique combination and balance to fulfill the objective of safely applying them to the petroleum medium for rapid degradation and elimination. The first component is carbon-containing and may be based upon any known compound or compounds used for the production of materials for emulsifying fats and oils containing non-toxic primary surfactants and/or secondary surfactants. Such components might be, but are not limited to, fatty acids, esters and alcohols or mixtures thereof, or any combination thereof taken from a long list of such compounds known to the art and used as fertilizers. This first component may also be referred to as the outer or oil phase A second component of the invention introduces to the hydrophobic carbon-containing emulsifying material a water based nutrient composition to be held in a microemulsion of water in oil for the purpose of culturing microorganisms normally extant or seeded in the spilled petroleum media. The nutrients consist of a nitrogen source such as urea or ammonium nitrate, sulfate or phosphate, as the source of phosphorous or any combination of thereof. This second component may also be referred to as the inner or water phase.

The water based nutrient material (second component) is introduced into the emulsifying first component under high shear to create a microemulsion with distinct homogenous droplets of nutrients dissolved in water, and preferably having a size ranging between about 20 and 400 angstroms. Actual embodiments of such microemulsions may have droplets from 100–200 angstroms with water present at 11%–50% by weight.

The third component of the invention comprises a compound that is also carbon-containing, both non-toxic and non-flammable, and acts as a diluent or stabilizer for the microemulsion to facilitate the safe and effective application of the active first and second components of the bioremediation composition evenly and thoroughly onto the petroleum product contaminant. The introduction of the substantially non-toxic, non-flammable, non-volatile diluent, present in the composition preferably in the range of about 15 to 35% by weight, reduces viscosity of the active ingredients (i.e. first and second components) to less than 200 cSt to allow delivery by spray or other dispersion methods.

The first or outer phase component, the assimilable emulsifying composition, provides the first or initial source of carbon for the culturing process; thereafter, the carbon contained within the spilled petroleum medium itself continues as the carbon reservoir in the bioremediation process. The first component consists of, but is not limited to, fatty acids, esters or alcohols such as oleic or stearic acid, preferably in concentrations ranging between about 20% to 50% by weight. Preferably, the first component, as well as the composite materials, will be non-toxic, as defined by Section 313 Title III of SARA.

The second component, or inner water phase nutrient-rich component, preferably comprises, but is not limited to, urea and a water soluble phosphate. In a preferred embodiment, the end use ratio of carbon in the target media to nitrogen from urea to phosphorous from the phosphate compound will be approximately 120:10:1.

The third component of the composition (also referred to as the diluent) of the invention preferably acts as a stabilizer that maintains the micro emulsion of the active ingredients (i.e. first and second components) in suspension as a pourable and sprayable liquid, and conveniently may have a shelf life of 6 months or more in a 40° F. to 100° F. environment.

This third component of the composition should preferably be both non-toxic as defined by Section 313 Title III of SARA reporting requirements and non-flammable with a flash point above the current standard for flammability (100° F.). As an example only, the third component may be selected from the ethoxylated alcohols or the like. One such composition, presently preferred in the composition of the invention, is 15%–28% by weight of butyl carbitol.

It will be appreciated that the composite produced by the combination of all three components—namely, emulsifiers, stabilizers and nutrients—can act as additional food sources.

In a preferred embodiment, the first and third components are ones where the carbon source is oleic acid and butyl carbitol [2-(2-butoxyethoxy)ethanol], present in concentrations from, for example, 25%–40% by weight.

Also in a preferred embodiment, the second component is one where the nitrogen source is water soluble urea which may be present in concentrations from about 0%–30% by weight. Further, the phosphorous source is preferably a phosphate ester which may be present as lauryl phosphate, in concentrations which may range between about 0% and 20% by weight.

In a further preferred embodiment, the third component, namely, the stabilizer/diluent, comprises butyl carbitol [2-(2-butoxyethoxy)ethanol], which may be present in concentrations of about 24.5%.

The invention may comprise many different combinations within the scope of the disclosure contained above.

The composition may be diluted extensively on site with water. The resultant emulsion is also stable, nontoxic and non-flammable. Dilution could be from 0 to 400% by volume. Dilution would allow for proper distribution of the composition over a wide area to achieve the desired 4–20% by weight of the composition to the pollutants. That is, the less concentrated the pollutant, the greater the dilution in order to achieve a practical method for achieving the desired concentration.

What is claimed is:

1. A composition for treatment of pollution comprising:

a first component comprising a non-toxic, non-flammable, microorganism assimilable carbon containing substance in an oil phase;

a second component comprising a non-toxic nutrient in a water phase, the second component being formed as a microemulsion within the first component; and a third component comprising a diluent added to the first and second components, the diluent comprising a non-toxic, non-flammable, microorganism assimilable carbon containing compound which is soluble in the first component and is selected to facilitate viscosity stabilization for extended storage, wherein the combination of the first, second and third components provide an initial source for culturing microorganisms present in a pollution site being treated.

2. A composition as claimed in claim 1 wherein the first component is selected from the group consisting of fatty acids, eaters, alcohols and combinations thereof.

3. A composition as claimed in claim 2 wherein the first component is an alcohol surfactant with the ability to emulsify fats and oils.

4. A composition as claimed in claim 1 wherein the oil phase is a straight chained, lipophilic carbon source.

5. A composition as claimed in claim 1 wherein the first component comprises an acid selected from the group consisting oleic acid, stearic acid and combinations thereof.

6. A composition as claimed in claim 5 wherein the oleic acid or stearic acid is present in the composition in concentrations ranging between about 20% and 50% by weight.

7. A composition as claimed in claim 1 wherein the first component comprises an external phase and the second component is an internal phase, the external and internal phases of the composition being in the form of a microemulsion wherein the microemulsion comprises droplets having a size of about 20 to about 400 angstroms.

8. A composition as claimed in claim 7 wherein the microemulsion comprises droplets having a size of about 100 to about 200 angstroms.

9. A composition as claimed in claim 1 wherein the carbon in the oil phase provides an initial source of carbon for culturinq microorganisms in a pollution site being treated.

10. A composition as claimed in claim 1 wherein the second component comprises a source of nitrogen.

11. A composition as claimed in claim 1 wherein the second component comprises a source of phosphorus.

12. A composition as claimed in claim 10 wherein the nitrogen is in a non-toxic form and is selected from the group consisting of urea, cyanamide, and combination thereof.

13. A composition as claimed in claim 11 wherein the phosphorus is in a non-toxic form and comprises a phosphate ester.

14. A composition as claimed in claim 1 further comprising water.

15. A composition as claimed in claim 1 wherein the diluent is present in sufficient amounts so as to facilitate the even application of the composition to a pollution area.

16. A composition as claimed in claim 1 wherein the diluent is butyl carbitol [2- (2-butoxysthoxy) ethanol].

17. A composition as claimed in claim 1 wherein the diluent is selected so as to maintain a flashpoint for the composition above 100° C.

18. A composition as claimed in claim 1 wherein the diluent is present in the composition in the amount of about 15% to about 35% by weight.

19. A composition as claimed in claim 1 wherein the diluent comprises an ethoxylated alcohol.

20. A composition as claimed in claim 1 wherein the diluent is selected to facilitate a reduction in viscosity of the first and/or second components to less than 200 cSt to allow delivery by spray or other dispersion methods.

21. A composition as claimed in claim 1 comprising 20 to 50% by weight carbon, 0 to 30% by weight nitrogen 0to 20%, phosphorus.

22. A composition as claimed in claim 21 comprising about 22% by weight carbon, about 15% by weight nitrogen, about 25% by weight phosphorus, about 22% by weight diluent and about 18% by weight water.

23. A composition as claimed in claim 13 wherein the phosphate ester is lauryl phosphate.

* * * * *

UNITED STATES PATENT AND TRADEMARK OFFICE
CERTIFICATE OF CORRECTION

PATENT NO. : 7,005,133 B2  
DATED : February 28, 2006  
INVENTOR(S) : Pavis et al.

It is certified that error appears in the above-identified patent and that said Letters Patent is hereby corrected as shown below:

Column 10,
Lines 11-12 "0to 20%, phosphorus." should read -- and 0 to 20%, phosphorus. --.

Signed and Sealed this

Twenty-fifth Day of April, 2006

JON W. DUDAS
*Director of the United States Patent and Trademark Office*

UNITED STATES PATENT AND TRADEMARK OFFICE
Certificate

Patent No. 7,005,133 B2                                                                           Patented: February 28, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Vincent Pavis, San Luis Obispo, CA (US); James Pavis, Salem, OR (US); and James W. Lynn, Phoenixville, PA (US).

Signed and Sealed this Eleventh Day of August 2009.

JOHANN R. RICHTER
*Supervisory Patent Examiner*
Art Unit 1616